United States Patent
Schardt et al.

(10) Patent No.: US 7,310,194 B1
(45) Date of Patent: Dec. 18, 2007

(54) SYSTEM FOR MONITORING AND DYNAMICALLY ADJUSTING HEAD-TO-DISK SPACING IN A DISK DRIVE

(75) Inventors: Bruce C. Schardt, Stacey, CA (US); Erhard Schreck, San Jose, CA (US); Jingbo Yu, San Jose, CA (US); Michael Mallary, Sterling, MA (US); Scott Hughes, Cupertino, CA (US); Duc Banh, San Jose, CA (US); Kazuhiro Saito, San Jose, CA (US); Donald J Brunnett, Plesanton, CA (US); Tim Glassburn, Milpitas, CA (US); Chris Hawks, Saratoga, CA (US); Thao Anh Nguyen, San Jose, CA (US); Andrew LeFebvre, Campbell, CA (US); Joerg Ferber, San Jose, CA (US); Richard K. Oswald, San Jose, CA (US); Brian Strom, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/101,089

(22) Filed: Apr. 7, 2005

Related U.S. Application Data

(60) Provisional application No. 60/560,832, filed on Apr. 8, 2004.

(51) Int. Cl.
  *G11B 21/02* (2006.01)
(52) U.S. Cl. .................................. 360/75
(58) Field of Classification Search .............. 360/75, 360/31, 25, 78.04
  See application file for complete search history.

(56) References Cited

U.S. PATENT DOCUMENTS

| 4,777,544 A | 10/1988 | Brown et al. |
| 5,421,943 A | 6/1995 | Tam et al. |
| 5,862,015 A | 1/1999 | Evans et al. |

(Continued)

OTHER PUBLICATIONS

U.S. Appl. No. 10/211,671, filed Aug. 2, 2002, McKenzie et al.

*Primary Examiner*—Fred F. Tzeng
(74) *Attorney, Agent, or Firm*—Westman, Champlin & Kelly, P.A.

(57) ABSTRACT

A disk drive includes a drive housing, a storage disk, a slider and a drive circuitry. The slider magnetically interacts with the storage disk, and includes a read/write head that is positioned to have an actual head-to-disk spacing greater than zero nanometers during rotation of the storage disk. The drive circuitry can determine and/or monitor the actual head-to-disk spacing at any time during the operation of the disk drive based on an amplitude or a change in the amplitude of a signal such as a variable gain amplifier signal. In one embodiment, the slider includes a slider mover that receives current via the drive circuitry and causes a deformation of a portion of the slider to change the head-to-disk spacing based on the amplitude of the signal. In another embodiment, the read/write head moves during substantially consistent rotational velocity of the storage disk from a first actual head-to-disk spacing equal to approximately zero nanometers, to a second actual head-to-disk spacing that is greater than zero nanometers based on a desired amplitude of the signal.

57 Claims, 8 Drawing Sheets

U.S. PATENT DOCUMENTS

| | | |
|---|---|---|
| 5,880,626 A | 3/1999 | Dean |
| 5,880,899 A | 3/1999 | Blachek et al. |
| 5,959,801 A | 9/1999 | Gillis et al. |
| 5,965,840 A | 10/1999 | Nagarajan et al. |
| 5,991,113 A * | 11/1999 | Meyer et al. ................ 360/75 |
| 5,999,372 A | 12/1999 | Peterson et al. |
| 6,011,239 A | 1/2000 | Singh et al. |
| 6,195,219 B1 | 2/2001 | Smith |
| 6,288,856 B1 * | 9/2001 | Ottesen et al. ............... 360/31 |
| 6,452,740 B1 | 9/2002 | Ghoshal |
| 6,538,836 B1 | 3/2003 | Dunfield et al. |
| 6,735,036 B1 | 5/2004 | Olim |
| 6,768,610 B1 | 7/2004 | Morris et al. |
| 2001/0030822 A1 | 10/2001 | Boutaghou et al. |
| 2002/0067565 A1 | 6/2002 | Keleman |
| 2002/0097528 A1 | 7/2002 | Williams et al. |
| 2003/0011915 A1 * | 1/2003 | Riddering et al. ............ 360/25 |
| 2003/0174430 A1 | 9/2003 | Takahashi et al. |
| 2005/0052773 A1 | 3/2005 | Suk |
| 2005/0057841 A1 | 3/2005 | Stover et al. |
| 2005/0078400 A1 | 4/2005 | Hassan |

\* cited by examiner

SYSTEM FOR MONITORING AND DYNAMICALLY ADJUSTING HEAD-TO-DISK SPACING IN A DISK DRIVE

RELATED APPLICATION

This application claims the benefit on U.S. Provisional Application Ser. No. 60/560,832 filed on Apr. 8, 2004. The contents of U.S. Provisional Application Ser. No. 60/560,832 are incorporated herein by reference.

BACKGROUND

Disk drives are widely used in computers, consumer electronics and data processing systems for storing information in digital form. The disk drive typically includes one or more storage disks, and one or more head suspension assemblies. Each head suspension assembly includes a slider having an air bearing surface, and a read/write head that transfers information to and from the storage disk. The rotation of the storage disk causes the slider to ride on an air bearing so that the read/write head is at a distance from the storage disk that is referred to as a "head-to-disk spacing" (also sometimes referred to herein as a "flying height").

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Further, a large variation in the head-to-disk spacing from slider to slider can cause significant issues in the manufacturing and reliability of the disk drives. Additionally, maintaining a relatively small and consistent head-to-disk spacing is further complicated by other factors such as thermal pole tip protrusion caused by thermal expansion of the read/write head (also referred to herein as write pole tip protrusion or "WPTP"), or by an overall temperature increase of the disk drive (also referred to herein as environmental pole tip protrusion or "EPTP") during various drive operations. For example, during a write operation, the electrical resistance of the write element generates heat in and around the read/write head, resulting in thermal expansion of a portion of the slider toward the storage disk. If the pole tip protrusion is too extensive, the slider can unintentionally contact the storage disk, causing off-track writing, damage to the slider, damage to the storage disk and/or a permanent loss of data.

Thus, knowing the actual in-situ head-to-disk spacing at various times during operation of the disk drive can be critical. Unfortunately, the ability to accurately determine the actual head-to-disk spacing in-situ has been extremely elusive. In conventional disk drives, only a determination of relative changes in head-to-disk spacing, i.e., an increase of 2 nanometers, a decrease of 3 nanometers, etc., has been attained without knowing the actual in-situ distance between the read/write head and the storage disk during operation of the disk drive.

SUMMARY

The present invention is directed to a disk drive that includes a drive housing, a storage disk, a slider and a drive circuitry. The storage disk is rotatably coupled to the drive housing. The slider magnetically interacts with the storage disk, and includes a read/write head that is positioned to have an actual head-to-disk spacing greater than zero nanometers during rotation of the storage disk. The drive circuitry can determine and/or monitor the actual head-to-disk spacing at any time during the operation of the disk drive.

In one embodiment, the slider includes a slider mover that receives current via the drive circuitry. In this embodiment, the slider mover causes a deformation of a portion of the slider to change the head-to-disk spacing. Further, the drive circuitry can receive a variable gain amplifier signal and can change the current to the slider mover to adjust the actual head-to-disk spacing based on an amplitude of the variable gain amplifier signal. The drive circuitry can also determine the actual head-to-disk spacing based at least partially upon a radial positioning of the read/write head relative to the storage disk. Additionally, in one embodiment, the drive circuitry can receive a present variable gain amplifier signal and can change the current to the slider mover to adjust the actual head-to-disk spacing based on a comparison between the present amplitude and a desired amplitude of the variable gain amplifier signal. Further, in one embodiment, a plurality of actual head-to-disk spacings are calibrated for the read/write head, with each actual head-to-disk spacing being determined based on a respective amplitude of the variable gain amplifier signal.

In another embodiment, the read/write head is moved during rotation of the storage disk between a first actual head-to-disk spacing equal to approximately zero nanometers, and a second actual head-to-disk spacing that is greater than zero nanometers. The rotational velocity of the storage disk remains substantially consistent whether the read/write head is at the first actual head-to-disk spacing or at the second actual head-to-disk spacing. The slider generates a signal having an amplitude that varies depending upon the actual head-to-disk spacing. The drive circuitry determines the second actual head-to-disk spacing based on the amplitude of the signal.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention is directed toward an apparatus that accurately determines the actual head-to-disk spacing for one or more read/write heads in a disk drive. By determining an amplitude of a variable gain amplifier signal at a known head-to-disk spacing, other otherwise unknown head-to-disk spacings can be ascertained. Further, other desired head-to-disk spacings can be achieved using a slider mover that can dynamically adjust the head-to-disk spacing with controlled thermal deformation of the slider.

Figure 1:
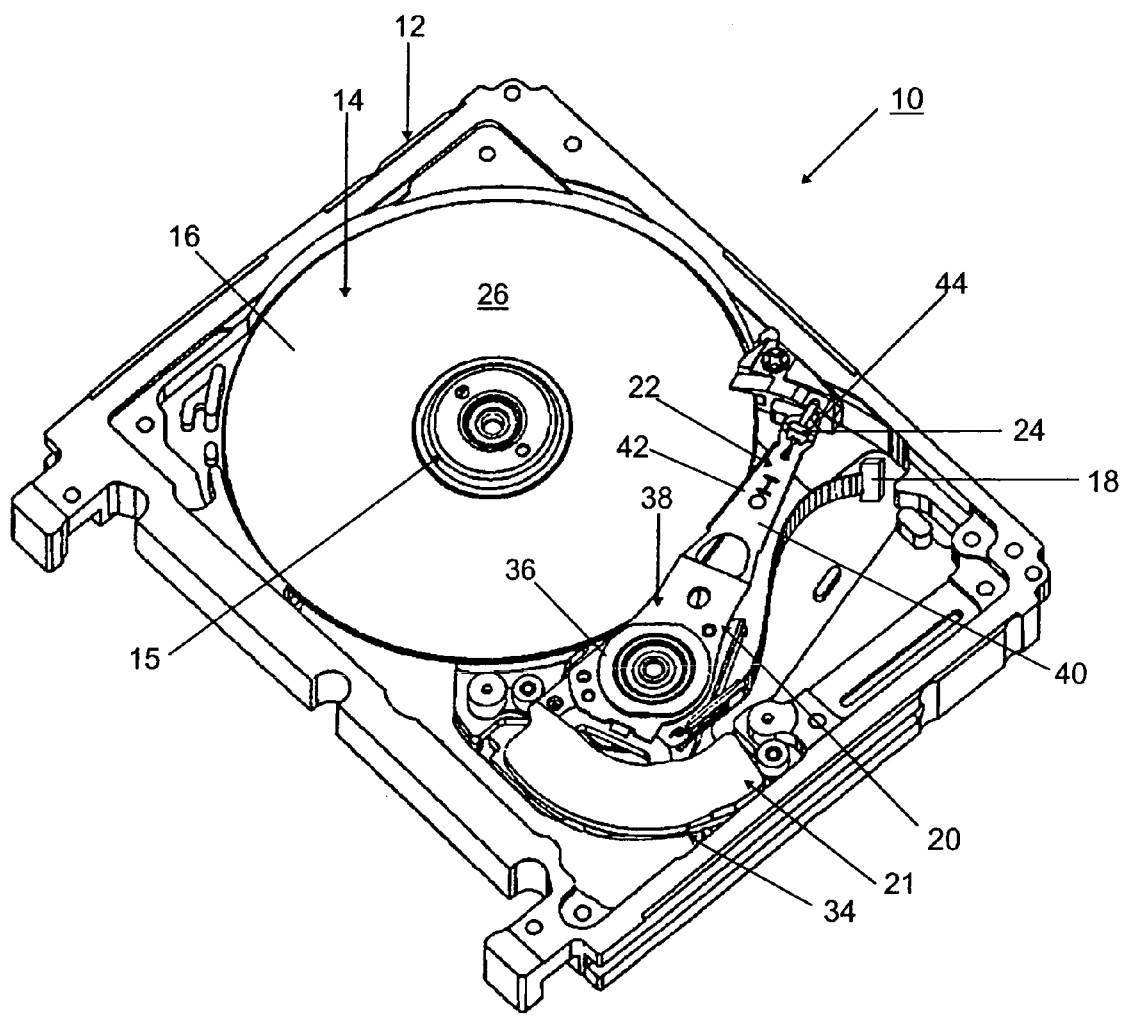
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head suspension assemblies 22, with each head suspension assembly 22 including a slider 24.

Each storage disk 16 includes one or more disk surfaces 26 that each has a plurality of concentric data tracks (not shown) that store data, including a target track. Further, the storage disk 16 can also include non-data tracks, such as servo tracks. Data is read from the storage disk 16 during a read operation and data is transferred to the storage disk 16 during a write operation. The read and write operations can each include a seek mode during which the actuator assembly 21 rapidly moves the slider assembly 24 to near the target track. The read and write operations can also include a settle mode which commences once the slider assembly 24 is positioned proximate the target track. Further, the read and write operations include a track following mode once the slider assembly 24 has settled or stabilized over the target track. Additionally, once the slider assembly 24 stabilizes over the target track, the read and/or write operations include the transfer of data between the slider assembly 24 and the storage disk 16.

The drive circuitry 18 sends and/or receives electrical current from the slider assembly 24 during read and/or write operations of the disk drive 10. Moreover, the drive circuitry 18 can control several additional functions within the disk drive 10. As provided herein, the drive circuitry 18 can receive signals from the slider assembly 24 and/or other components of the disk drive 10, which can be used to detect contact between the slider assembly 24 and the storage disk 16. Further, the drive circuitry 18 can direct current to the slider assembly 24 to dynamically adjust and control the spacing between portions of the slider assembly 24 and the storage disk 16.

The drive circuitry 18 can be included in a printed circuit board assembly (not shown). Further, the drive circuitry 18 can include one or more preamplifiers that can adjust and/or amplify the electrical signals that are transmitted between the slider assembly 24 and other components of the drive circuitry 18. In one embodiment, the drive circuitry 18 is secured to and/or enclosed by the drive housing 12.

The head stack assembly 20 illustrated in FIG. 1 also includes an actuator motor 34, an actuator hub 36, one head suspension assembly 22, and an actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes one slider 24 and a suspension 40 having a load beam 42 and a flexure 44. The suspension 40 is secured to the actuator arm 38, and supports the slider 24 proximate one of the disk surfaces 30 of the storage disk 16.

The slider 24 transfers information between the drive circuitry 18 and the storage disk 16. The design of the slider 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
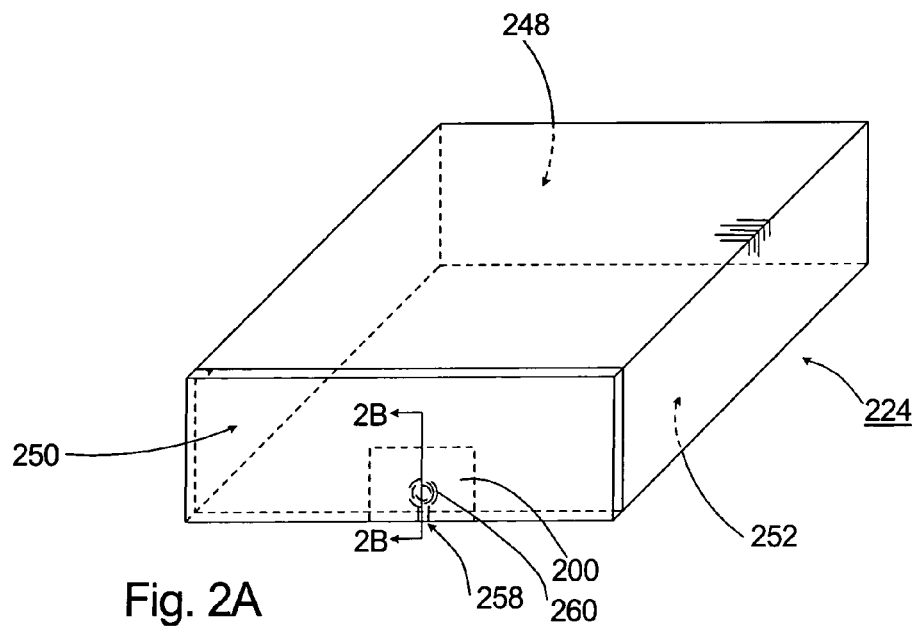
FIG. 2A is a perspective view of a slider having features of the present invention including a slider mover.

FIG. 2A illustrates a rear perspective view of one embodiment of the slider 224. In this embodiment, the slider 224 includes a read/write head 258 and a slider mover 200 (illustrated in phantom) that is selectively used to deform the slider 224 near the read/write head 258 in order to change the head-to-disk spacing. The read/write head 258 includes a write element 260 (illustrated in phantom). The slider 224 further includes a leading surface 248, an opposed trailing surface 250 and a bottom first surface 252, which forms an air bearing surface (ABS) of the slider 224.

Figure 2B:
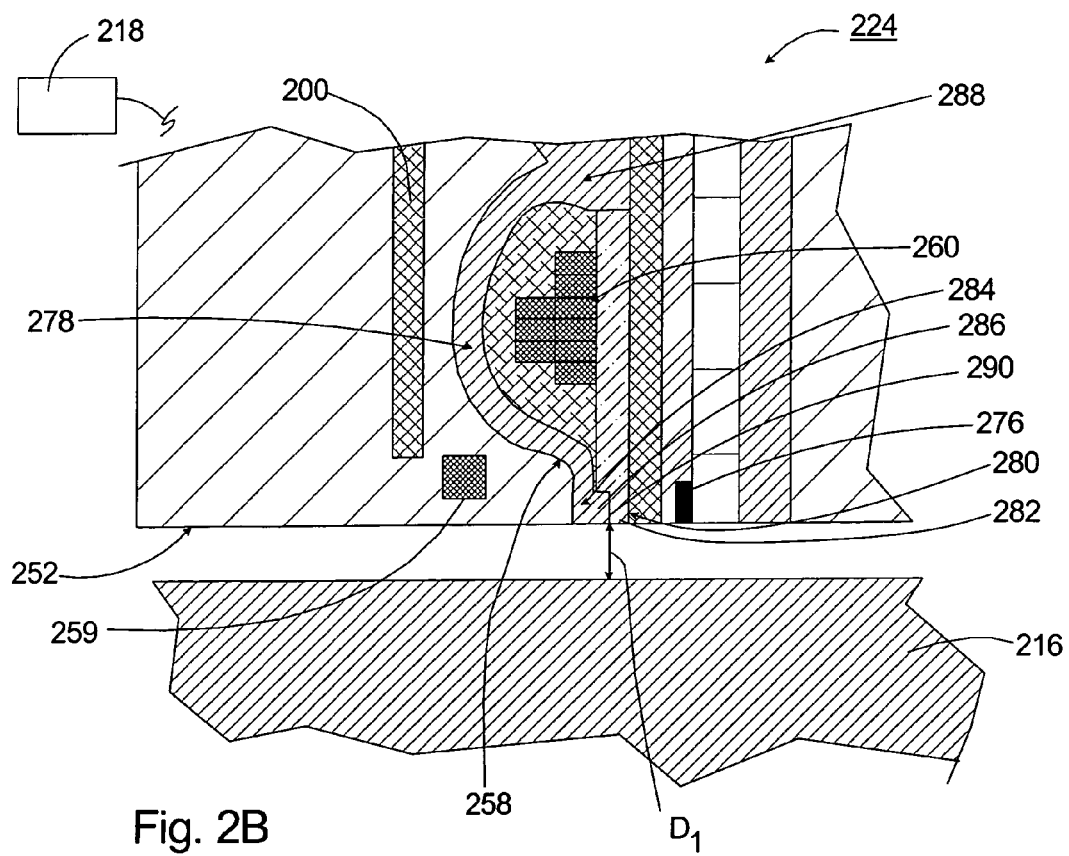
FIG. 2B is an enlarged cross-sectional view of a portion the slider in FIG. 2A while a first level of current is directed to the slider mover.

FIG. 2B is an enlarged, partial cross-sectional illustration of the slider 224 shown in FIG. 2A, and a portion of a storage disk 216. FIG. 2B illustrates that the slider 224 includes the read/write head 258 and a temperature sensor 259. The read/write head 258 includes a read head 276 and a write head 278. The temperature sensor 259 is used to sense the temperature of a portion of the slider 224. Further, the temperature sensor 259 can relay temperature data to the drive circuitry 28 for processing, as provided in greater detail below.

The positioning and number of slider movers 200 can be varied. Moreover, the composition and geometry of the slider mover 200 can be varied to suit the design requirements of the slider 224 and the disk drive 10. For example, the slider mover 200 can be a planar layer that is substantially parallel to the trailing surface 250. Alternatively, the slider mover 200 can also be positioned to not be parallel to the trailing surface 250.

In the embodiment illustrated in FIG. 2B, the slider mover 200 is not in direct electrical communication with the write element 260. Stated another way, the slider mover 200 can be substantially electrically isolated from the write element 260, e.g. the slider mover 200 is not in direct contact with the write element 260, nor is there any significant electrical coupling between the slider mover 200 and the write element 260. Alternatively, the slider mover 200 and the write element 260 can be electrically coupled, or they can be directly connected.

The positioning and design of the write head 278 can be varied. In FIG. 2B, the write head 278 includes a leading pole 280 having a leading pole tip 282, a trailing pole 284 having a trailing pole tip 286, a yoke 288, and a write head gap 290.

More specifically, FIG. 2B illustrates the general relationship between an actual head-to-disk spacing $D_1$ when the drive circuitry 218 is directing a first level of current to the slider 224. As used herein, the first level of current can be a relatively low level of current or zero current. At various times during operation of the disk drive, little or no current is directed to the slider 224, and little or no deformation occurs in the area of the read/write head 258 or the air bearing surface 252, as illustrated in FIG. 2B. As referred to herein, during times when the read/write head 258 is not contacting the storage disk, the slider is said to be in a first position, as illustrated in FIG. 2B.

Figure 2C:
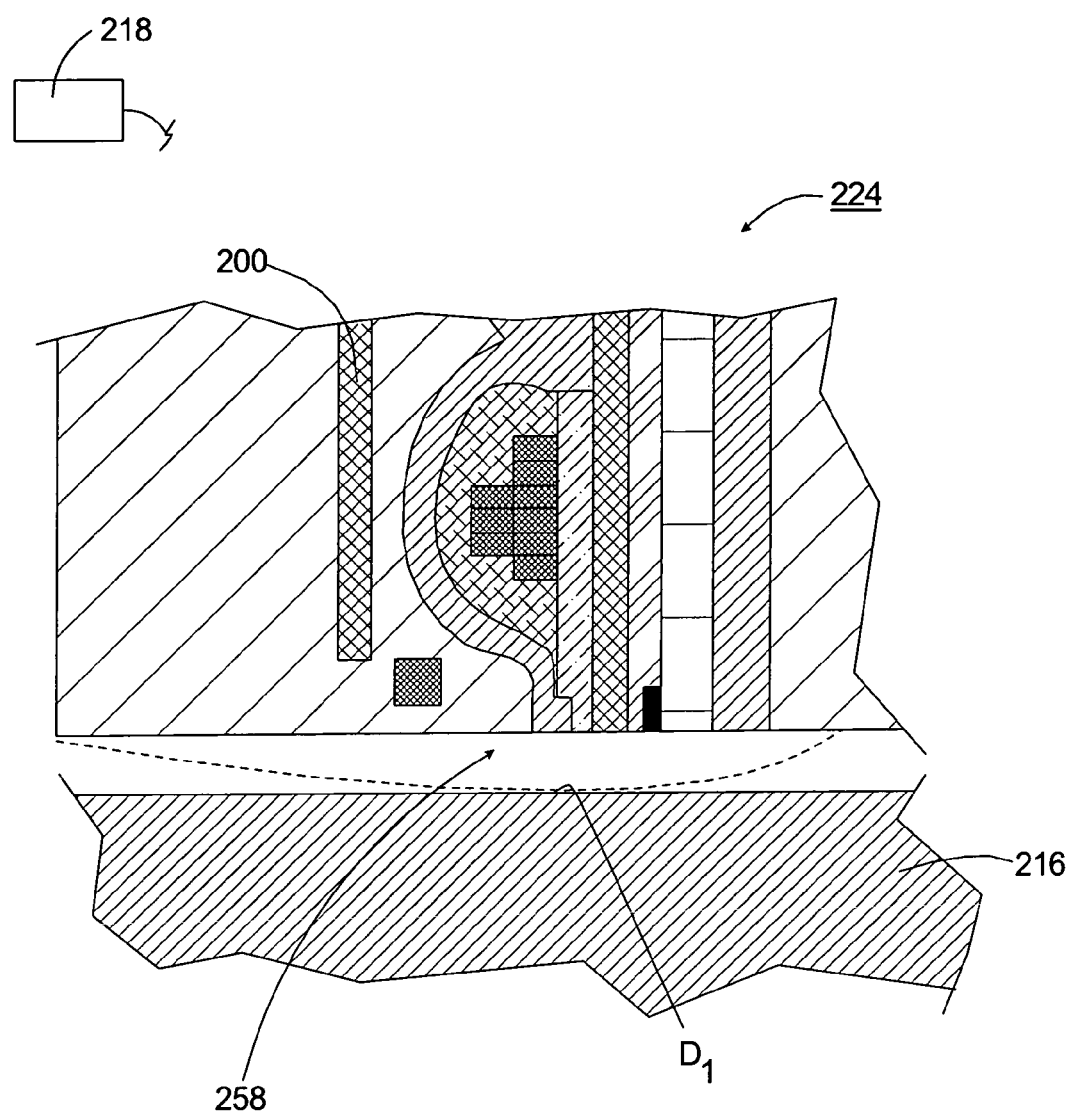
FIG. 2C is an enlarged cross-sectional view of a portion of the slider in FIG. 2A including a simplified representation of a portion of the slider while a second level of current is directed to the slider mover.

FIG. 2C illustrates the relationship between the actual head-to-disk spacing $D_1$ that occurs after the drive circuitry 218 directs a second level of current to the slider mover 200. In FIG. 2C, the second level of current represents at least a minimum amount of current to cause sufficient thermal expansion of a portion of the slider 224 that results in relatively consistent, non-destructive physical contact between the slider 224 and the storage disk 216.

As referred to herein, upon head-to-disk contact, the slider 224, including the read/write head 258, is said to be in a second position relative to the storage disk 216, as generally represented in phantom in FIG. 2C. The portion of the slider 224 illustrated in phantom in FIG. 2C is shown as a relatively smooth curve for purposes of illustration and to show the contrast with the slider 224 in the first position (illustrated by solid lines). It is recognized that when the slider 224 is in the second position, the actual configuration of the slider 224 including the read/write head 258 may not be completely smooth, but can have a somewhat jagged or otherwise inconsistent configuration.

Consistent contact between the slider 224 and the storage disk 216 is also referred to herein as "head-to-disk contact", where $D_1$ is approximately equal to 0 nm. As used herein, head-to-disk contact is distinguished from sporadic or anomalous contact that occurs when the read/write head 258 contacts a thermal asperity (not shown) or some other surface deviation on the storage disk 216, which normally has a duration on the order of less than one microsecond up to approximately 3 microseconds.

In contrast, head-to-disk contact as used herein has a duration that is sufficient to establish non-anomalous contact between the read/write head 258 and the storage disk 216, such as a relatively consistent flying height of 0 nm. Stated another way, the disk drive 10 and methods provided herein facilitate a determination of head-to-disk contact having a requisite duration that establishes a substantially constant flying height or head-to-disk spacing of 0 nm. In one embodiment, head-to-disk contact has a duration that is greater than approximately 10 microseconds. In alternative non-exclusive embodiments, head-to-disk contact can have a duration that is greater than approximately 25, 50, 100, 500, 1,000 or 2,000 microseconds which is recognized by one or more of the methods provided herein. Head-to-disk contact of this relatively long duration clearly establishes non-anomalous contact between the read/write head 258 and the storage disk 216.

As provided herein, head-to-disk contact can be intentionally induced during production and/or self-testing of the disk drive, and/or on a predetermined (automatic) or an "as needed" (manual) basis during in-situ operation of the disk drive 10. For example, head-to-disk contact can be intentionally caused during self-testing and/or during an optimization process of the disk drive 10. In one embodiment, by purposely causing non-destructive head-to-disk contact or withdrawing the slider 224 from non-destructive head-to-disk contact, and by providing the ability to accurately detect when the slider 224 changes between the first position and the second position (in either direction), the disk drive 10 can be calibrated to more precisely determine, monitor and/or adjust the head-to-disk spacing during various operations of the disk drive 10.

For example, as provided herein, the drive circuitry 218 can detect the approximate moment when actual, relatively consistent head-to-disk contact first occurs (changing from the first position to the second position). Alternatively or in addition, the drive circuitry 218 can detect the approximate moment when the slider 224 is first withdrawn from relatively consistent contact with the storage disk 216 (changing from the second position to the first position).

Head-to-disk contact provides a "zero-clearance reference" that is used in various applications relative to head-to-disk spacing, as set forth herein. Once the zero-clearance reference is established, the drive circuitry 218 can monitor relative changes in actual head-to-disk spacing, and can also accurately determine and facilitate adjustment of the actual head-to-disk spacing at any time during operation of the disk drive 10. Further, with this design, the disk drive 10 can operate at a more suitable head-to-disk spacing depending upon the specific operation being performed.

Head-to-disk contact can be induced by directing current to the slider mover 200 while the slider 224 is flying during rotation of the storage disk 216 to cause a portion of the slider 224 to deform toward the storage disk 216. Current to the slider mover 224 can be maintained or increased until head-to-disk contact is determined by one of the methods provided herein. Moreover, head-to-disk contact can be induced without the need for substantially changing the nominal rotational velocity (normal operating speed) of the storage disk 216. Thus, the rotational velocity of the storage disk 216 can be maintained substantially consistent both during and following inducement and detection of head-to-disk contact.

As used herein, substantially consistent rotational velocity is achieved by using the drive circuitry or other suitable controller to maintain a nominal rotational velocity of the storage disk. For example, although relatively minor fluctuations in the rotational velocity can occur during normal operation, the drive circuitry is not actively adjusting, e.g. decreasing, the rotational velocity of the storage disk to an extent that intentionally causes head-to-disk contact, for example. In alternative, non-exclusive embodiments, minor fluctuations in rotational velocity result in a change of less than approximately 0.1%, 0.5%, 1.0%, 2.0%, 5.0%, 10% or 25% in the head-to-disk spacing during normal operation of the disk drive, such as during reading, writing, seeking, read-write transitions, write-read transitions, seek mode, idle mode, etc. With this design, power is conserved because the rotational speed is not actively being substantially modified, damage to the slider 224 and/or storage disk 216 is inhibited due to the more rapid detection of head-to-disk contact, and firmware is simplified because coordination and adjustment of the velocity of the disk spindle 15 (illustrated in FIG. 1) is not required.

Alternatively, head-to-disk contact can be induced by other methods, such as by use of an actuator means, by altering the rotational velocity of the storage disk, by altering the orientation of the slider relative to the storage disk, or by any other suitable method known to those skilled in the art.

Figure 3:
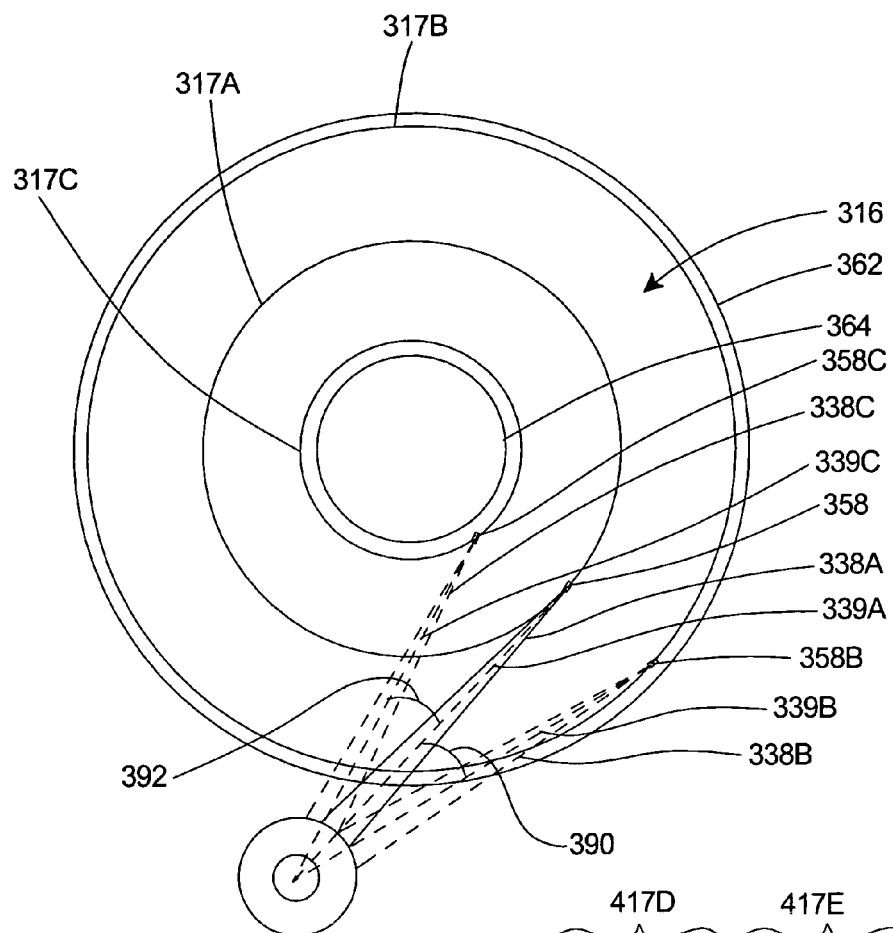
FIG. 3 is a simplified top view of a storage disk and an actuator arm illustrated at three different skew angles.

FIG. 3 is a simplified representation of a portion of a disk drive illustrating three different positions of an actuator arm 338A-C relative to the storage disk 316. The orientation of the actuator arm 338A-C relative to the storage disk 316 is also referred to herein as the skew angle. For example, at a zero skew angle, a longitudinal axis 339A of the actuator arm 338A in a first position forms a line tangent to a first track 317A at the point of track following by a read/write head 358A. Thus, when the read/write head 358A is positioned over the first track 317A, the actuator arm 338A is at the zero skew angle (also referred to herein as "zero skew").

The actuator arm 338B is positioned at a positive skew angle 390 when the actuator arm 338B moves away from zero skew toward the outer diameter 362 of the storage disk 316. FIG. 3 shows the actuator arm 338B (in phantom) in a second position with the read/write head 358B positioned at a positive skew angle 390 over a second track 317B. Thus, a longitudinal axis 339B of the actuator arm 338B in a second position forms a line tangent to a second track 317B at the point of track following by the read/write head 358B.

The actuator arm 338C is positioned at a negative skew angle 392 when the actuator arm 338C moves away from zero skew toward an inner diameter 364 of the storage disk 316. FIG. 3 shows the actuator arm 338C (in phantom) in a third position with the read/write head 358C positioned at a negative skew angle 392 over a third track 317C. Thus, a longitudinal axis 339C of the actuator arm 338A in a third position forms a line tangent to a third track 317C at the point of track following by the read/write head 358C. The range of skew angles 390, 392 can vary depending upon the design requirements of the disk drive.

Figure 4:
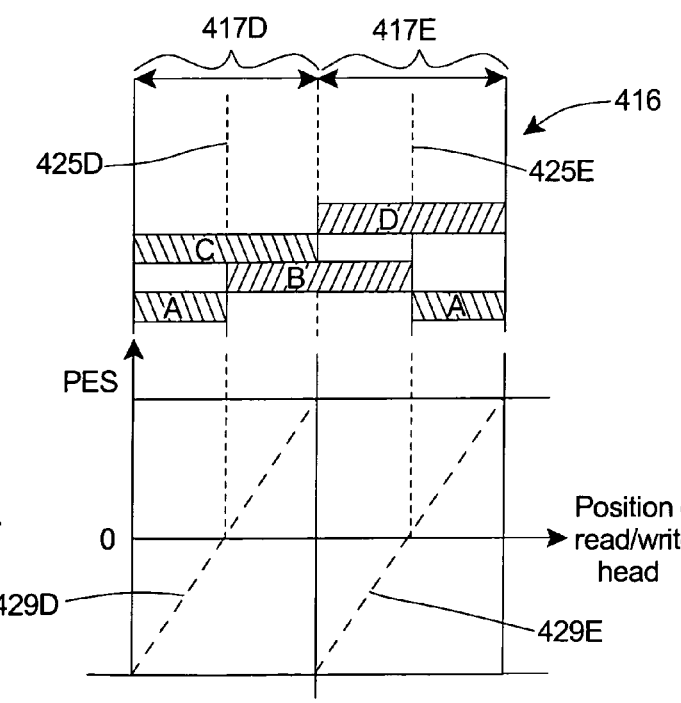
FIG. 4 is a representation of a portion of a first track and an adjacent second track of a storage disk in relation to a position error signal.

FIG. 4 is a representation of a portion of a first track 417D and an adjacent second track 417E of a storage disk 416, along with a graph of position error signal (PES) as a function of positioning of the read/write head. One method of determining the positioning accuracy of the read/write head relative to a centerline 425D of the first track 417D, for example, is by monitoring a PES variance (also sometimes referred to herein as "modulation"). The PES (illustrated by dashed line 429D) is a voltage signal having an amplitude having an absolute value that generally increases as the read/write head moves further off the centerline 425D of the first track 417D.

In one embodiment of the present invention, head-to-disk contact can be determined by monitoring the PES variance at certain designated tracks (such as tracks 417D and 417E illustrated in FIG. 4) on the storage disk 416. As an overview, the PES variance method essentially includes monitoring changes in the PES as an increasing level of current is directed to the slider mover. Once the PES deviates by a predetermined amount from the PES that occurs during non-head-to-disk contact, head-to-disk contact can be assumed or definitively determined to have occurred, as explained in greater detail below.

In one embodiment, the PES 429D can be derived from one or more servo burst patterns A-D positioned at fixed offsets from the centerline 425D of the first track 417A. Typically, the PES 429D is received by the drive circuitry, and this information can be used to adjust the positioning of the read/write head relative to the centerline 425D of the first track 417D. As used herein, the first track 417D and the second track 417E can be representative of any track on the storage disk 416.

Normally, when head-to-disk contact occurs at certain skew angles, a sudden change of direction of a force at the actuator arm occurs. Stated another way, actual head-to-disk contact results in an increase in the likelihood that the read/write head will suddenly move away from a centerline 425D, 425E of the track 417D, 417E being followed.

For example, when the slider is positioned near the inner diameter of the storage disk 416, because of the rotation of the storage disk 416 in relation to the negative skew angle, head-to-disk contact causes the slider to suddenly move off-track in an outwardly direction. On the other hand, when the slider is positioned near the outer diameter of the storage disk 416, because of the rotation of the storage disk 416 in relation to the positive skew angle, head-to-disk contact causes the slider to suddenly move off-track in an inwardly direction. Rotation of the storage disk 416 in an opposite direction can yield results opposite from those provided above. This sudden movement of the slider is detected by the servo system as a change and/or increase in the amplitude of the PES, which is detected very shortly after the sudden movement. The specific skew angles that can be used for determining head-to-disk contact by monitoring PES variance can be varied.

As explained previously, as current to the slider mover is increased, the power output of the slider mover increases, causing a portion of the slider near the read/write head to thermally expand toward the storage disk. However, at a certain current level directed to the slider mover, thermal expansion results in head-to-disk contact. At this point, a deviation from the expected PES value can be determined by the drive circuitry. Depending upon the extent of the deviation from the normal PES curve, a specific confidence level that head-to-disk contact has occurred can be established. By performing this type of monitoring process at various skew angles, the confidence level of head-to-disk contact at a given percentage of variance from the expected PES curve can effectively be increased.

Thus, during manufacture and/or testing of a given disk drive, or during operations of the disk drive during use, the level of current directed to the slider mover that causes head-to-disk contact can be determined for any given slider at any suitable skew angle. Further, during manufacture, testing and/or during in-situ use of the disk drive, the level of current that will result in head-to-disk contact at various times during operation of the disk drive can be determined. For example, this information can be used in order to reduce the likelihood of unwanted head-to-disk contact during a read operation, a write operation or other operations, as examples.

Alternatively, or in conjunction with the above embodiment, head-to-disk contact can be detected using a synchronous PES method. The synchronous PES method includes monitoring the modulation of the PES at various rotational locations on the storage disk, and is based on the specific frequency of rotation of the storage disk.

Using the synchronous PES method, monitoring of the PES is associated with the frequency of rotation of the storage disk. Because the rotation rate of the storage disk in the disk drive is known, in one embodiment, current to the slider mover to cause thermal expansion of the slider can be turned on and off, or increased and decreased, based on this rotation rate. For example, at a particular skew angle, a specific level of current can be directed to the slider mover to cause thermal expansion of the slider during every other revolution of the storage disk.

The duration of directing current to the slider mover can be approximately equal to the time required for the storage disk to rotate one complete revolution. For instance, in a disk drive having a storage disk that rotates at 7,200 revolutions per minute (120 Hz), the duration of each revolution is $\frac{1}{120}$ of a second. Therefore, in this embodiment, the duration of current being directed to the slider mover is also $\frac{1}{120}$ of a second, lasting for one complete revolution. In one embodiment, the current to the slider mover can then be arrested for $\frac{1}{120}$ of a second (the next revolution of the storage disk). Thus, the current to the slider mover commences once every $\frac{1}{60}$ of a second, and lasts for $\frac{1}{120}$ of a second before the current is arrested for $\frac{1}{120}$ of a second. This cyclic process can be repeated any number of times in succession, or with a time lag between such cycles.

Figure 5:
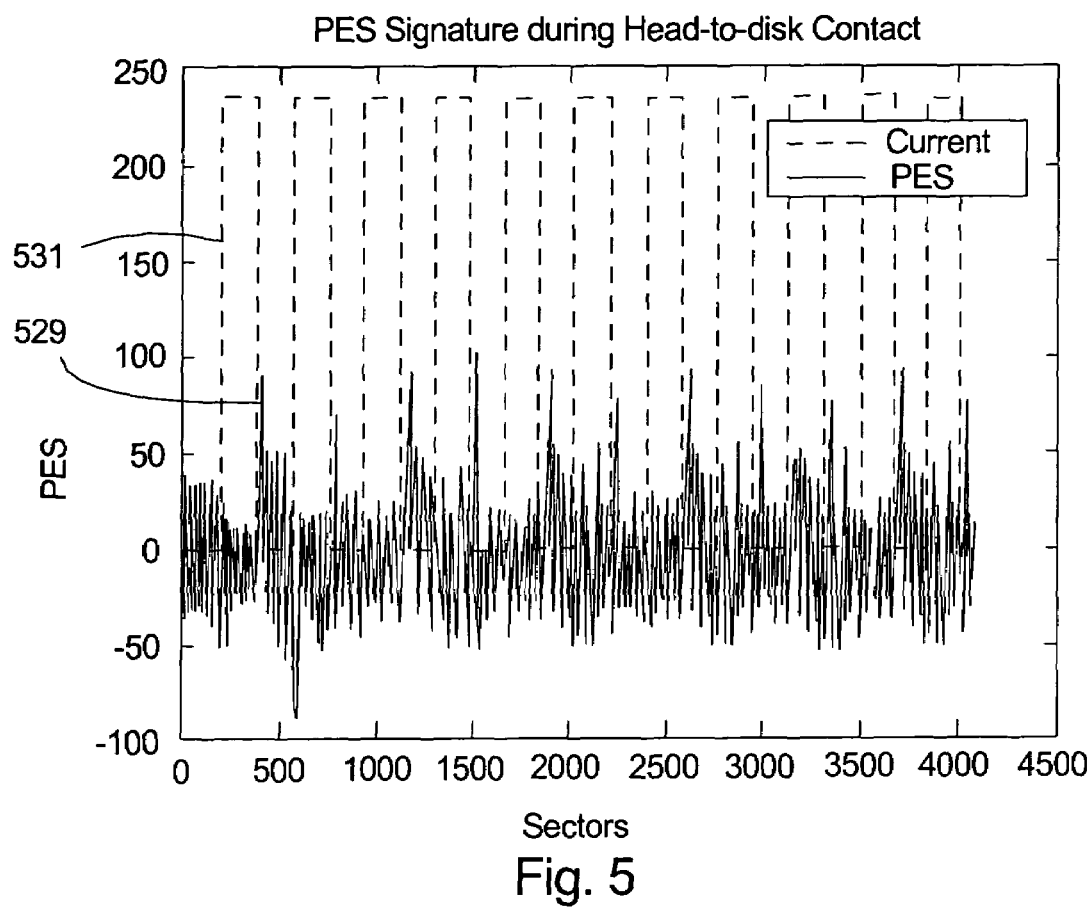
FIG. 5 is a graphical representation of the position error signal as a function of time, while alternately turning current on and off to the slider mover.

FIG. 5 is a graphical representation of the PES 529 as a function of time, while alternately turning current on and off to the slider mover. The current to the slider mover is illustrated by a square wave shown by dashed line 531. In FIG. 5, time is measured by the number of servo sectors that are read by the read head. In this embodiment, each rotation of the storage disk includes reading approximately 200 servo sectors. Thus, in the embodiment represented by the graph in FIG. 5, current is repeatedly directed to the slider mover for one complete revolution, then not directed to the slider mover for one complete revolution.

FIG. 5 illustrates that the amplitude of the PES 529 spikes immediately following a change in directing current to the slider mover. The spikes in the amplitude of the PES 529 which are detected by the servo system are attributable to one of two sudden changes: (1) head-to-disk contact has just occurred, or (2) the read/write head has just withdrawn from contact with the storage disk. Following each such spike, the servo system can adjust the positioning of the slider, and thus the read/write head, which causes the amplitude of the PES 529 to diminish until the next change in directing current to the slider mover occurs at the predetermined interval, in this example.

By repetitiously and consistently comparing PES with current to the slider mover alternately being turned on and off, extraneous noises that are unrelated to head-to-disk contact can basically be discounted or disregarded, leaving behind a relatively unique PES frequency pattern. This PES frequency pattern can be attributable to the occurrence of head-to-disk contact. With this design, because extraneous noise has effectively been removed from the analysis, the signal to noise ratio is increased, providing a more accurate determination of the timing of the onset of head-to-disk contact. With this design, a zero reference point, e.g. a head-to-disk spacing approximately equal to 0 nm, is more precisely defined, which allows the drive circuitry to more accurately determine and adjust the in-situ head-to-disk spacing. The zero reference point is also sometimes referred to herein as the "reference head-to-disk spacing".

In still another embodiment, changes between head-to-disk contact and non-head-to-disk contact can be detected using a null current (also sometimes referred to as a "Null-I") method. The approximate moment in time of a change between head-to-disk contact and non-head-to-disk contact can be determined by monitoring at least a portion by the current directed toward the actuator motor 34 (illustrated in FIG. 1) which is based on servo information received by the drive circuitry. This current is the manifestation of the Null-I code in the firmware of the drive circuitry instructing the actuator motor 34 to compensate for off-track movement of the slider. In other words, this current is used to adjust the positioning of the read/write head relative to one or more designated tracks (such as tracks 417D and 417E illustrated in FIG. 4) on the storage disk 416. In this embodiment, when the position error signal has exceeded a predetermined threshold level, the drive circuitry directs current to the actuator motor 34 to compensate for any off-track movement (which is reflected in a PES spike) to drive the PES toward zero and maintain the PES as close to zero as possible.

In this embodiment, monitoring the current directed toward the actuator motor 34 as a result of servo signals such as PES can result in a more steady-state observation over a period of time, i.e. $\frac{1}{120}^{th}$ of a second, $\frac{1}{240}^{th}$ of a second, $\frac{1}{60}^{th}$ of a second, or other multiples or fractions of the fundamental frequency. Stated another way, the current directed toward the actuator motor 34 adjusts the position of the read/write head, and maintains this positioning until a further change in PES occurs, at which point the current is readjusted and maintained.

Figure 6A:
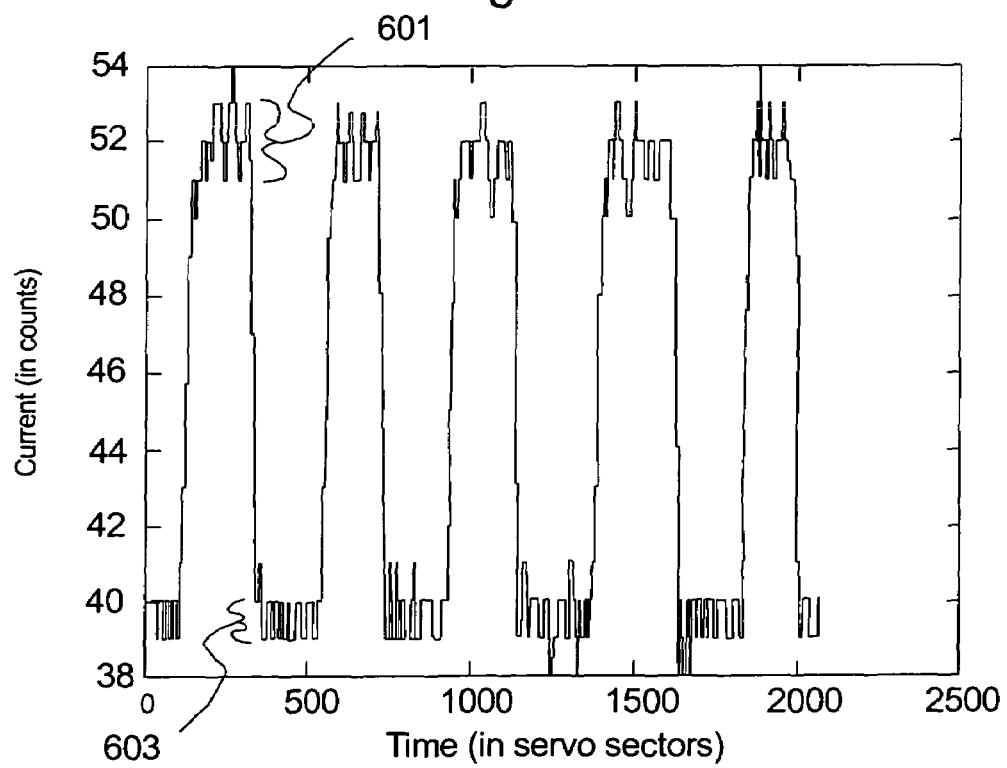
FIG. 6A is a graphical representation of the relationship between current to an actuator motor of the disk drive caused by changes in position error signal as a function of time.

FIG. 6A is a graphical representation of current directed toward the actuator motor 34 as a result of PES information received by the drive circuitry as a function of time for a given level of power that is alternately turned on and off to the slider mover 200 (illustrated in FIG. 2A). In FIG. 6A, time is measured by the number of servo sectors that are read by the read head. In this embodiment, each rotation of the storage disk includes reading approximately 200 servo sectors. Thus, in this example, the power to the slider mover 200 is alternately on for approximately $\frac{1}{120}^{th}$ of a second (approximately 1 revolution of the storage disk) and off for approximately $\frac{1}{120}^{th}$ of a second.

The current directed toward the actuator motor 34 to adjust for changes in PES is at least partially determined by an integrator signal that resides in the firmware of the disk drive. Stated another way, in this embodiment, the current directed toward the actuator motor 34 is basically an integrated output of the PES. Each "count" of the integrator signal corresponds to a predetermined level of current that is directed to the actuator motor 34. For example, in one embodiment, each count of the integrator signal equals approximately 55 microamps of current, although the level of current per count can vary. The resultant current to the actuator motor 34 is substantially a square wave, representing more of a steady-state level.

Although FIG. 6A illustrates an example where the timing is somewhat similar to the synchronous PES embodiment previously described, it is recognized that such alternating on/off timing is not required for the null current method. Stated in another manner, because the current to the actuator motor is relatively constant following a change in PES over a designated track until another change in PES occurs, the current provides a unique signature for the drive circuitry to determine whether or not a change between head-to-disk contact and non-head-to-disk contact has occurred.

In essence, the current changes between two basic levels based on a bi-directional change in the PES: a first level 601 (illustrated at approximately 51-53 counts in FIG. 6A) that causes a first bias force resulting in rotation of the actuator assembly in a first direction, and a second level 603 (illustrated at approximately 39-40 counts in FIG. 6A) that causes a second bias force resulting in rotation of the actuator assembly in a second direction that is opposite the first direction. If the drive circuitry detects that the read/write head has moved off-track in one direction, current is directed to the actuator motor 34 to rotate the actuator assembly in the opposite direction to bring the PES toward zero. It is recognized that the first level 601 and second level 603 can vary depending upon the design of the disk drive, and that the values of current included in FIG. 6A are provided for representative purposes and ease of discussion only.

In one embodiment, if the deviation between the first level 601 and the second level 603 directed to the actuator motor as a result of the changes in PES is at least approximately 10%, a change in the head-to-disk contact status can be assumed to have occurred. In alternative, non-exclusive embodiments, if the deviation between the first level 601 and the second level 603 directed to the actuator motor as a result of the changes in PES is at least approximately 1%, 5%, 20%, 30%, 40%, 50%, 75%, or 100%, a change in the head-to-disk contact status can be assumed to have occurred at a particular confidence of less than or up to 100%.

By determining the timing of the transition between the first level 601 and the second level 603, and factoring in a time constant to initiate the current to the actuator motor caused by the change in PES information, an accurate determination of the approximate moment of transition between head-to-disk contact and non-head-to-disk contact (in either direction) can be ascertained.

Head-to-disk contact can also be detected by a readback voltage amplitude method. The readback voltage amplitude method includes monitoring the readback voltage amplitude while systematically directing current to the slider mover during rotation of the storage disk. It is understood in the art that the strength of the magnetic field of the storage disk increases exponentially as detected by the read/write head as the head-to-disk spacing decreases linearly. This increase in the magnetic field results in a corresponding, proportional exponential increase in the readback voltage amplitude. In alternative embodiments, the monitoring of readback voltage amplitude can be performed using a variable gain control servo signal (VGAS) or a variable gain control data readback signal (VGAR) from a read channel of the disk drive. Further, the readback voltage amplitude method can be used at any skew angle.

Figure 6B:
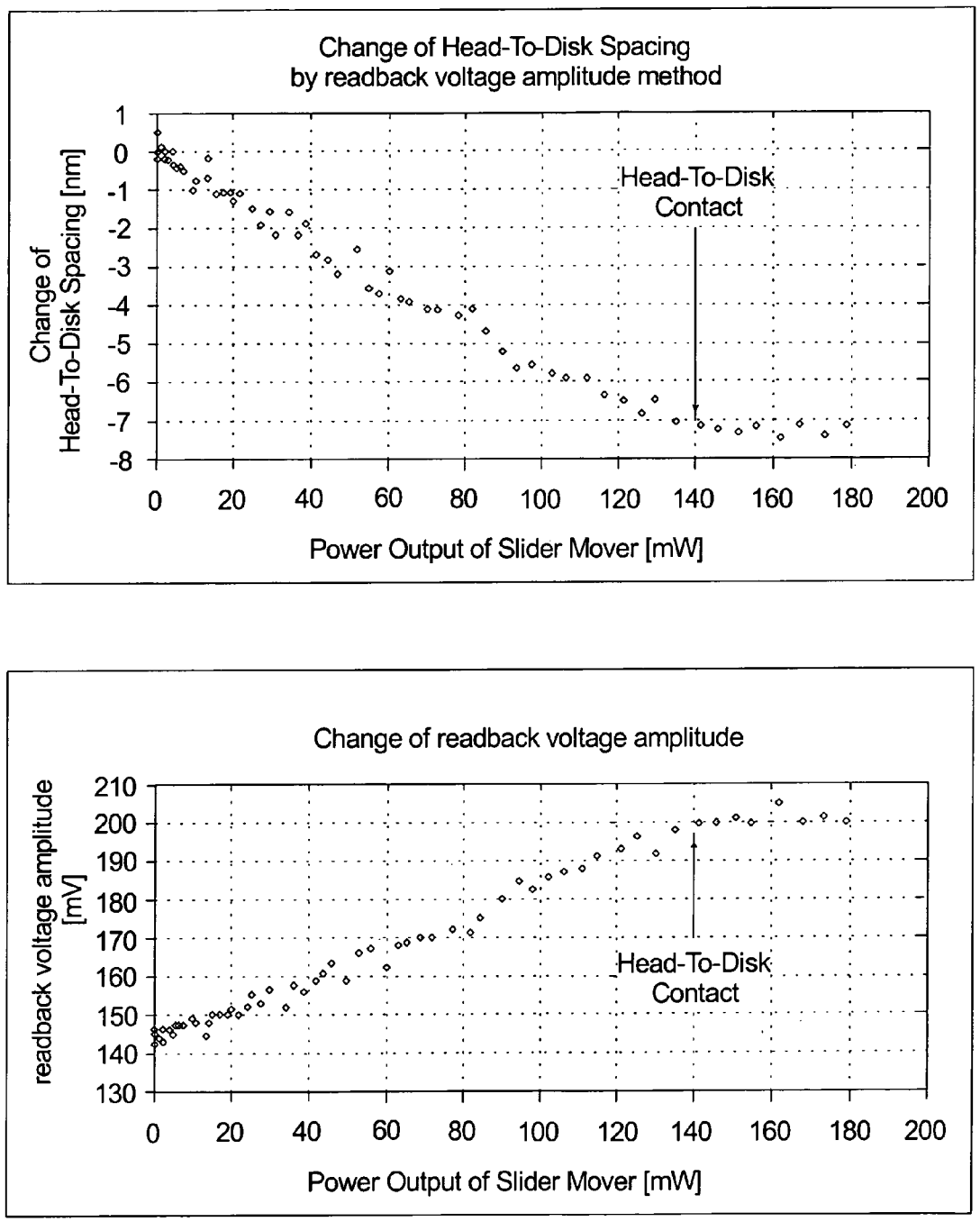
FIG. 6B shows two related graphs illustrating a representation of the change in head-to-disk spacing and readback voltage amplitude as a function of power generated by the slider mover.

FIG. 6B shows two related graphs illustrating the relationship between head-to-disk spacing (upper graph) and readback voltage amplitude (lower graph), which is also sometimes referred to as an amplitude of a variable gain amplifier (VGA) signal, as a function of power output of the slider mover. An increase in the level of current to the slider mover causes the power output of the slider mover likewise to increase. As illustrated in the upper graph in FIG. 6B, this increase in power results in a decrease in head-to-disk spacing (shown as an increasingly negative change in head-to-disk spacing) due to the thermal expansion of the slider assembly. Once head-to-disk contact occurs, a further increase in the level of current to the slider mover (and thus the power output of the slider mover) does not result in any further substantial change in the head-to-disk spacing.

As illustrated in the lower graph in FIG. 6B, the increase in power, and thus, the decrease in head-to-disk spacing, results in an increase in the readback voltage amplitude until head-to-disk contact occurs. Consequently, at this point, the readback voltage amplitude likewise does not substantially change, as illustrated by the substantially level section of data points at approximately 200 mV in the lower graph in FIG. 6B.

Therefore, head-to-disk contact can be determined by gradually or incrementally increasing current to the slider mover to increase the power output of the slider mover, and monitoring the readback voltage amplitude. Once the readback voltage amplitude no longer increases with a corresponding increase in current to the slider mover, head-to-disk contact can be determined to have occurred.

In a further embodiment, head-to-disk contact can be detected by a variable frequency oscillator ("VFO") method. The VFO method includes monitoring and/or analyzing a VFO signal that is received by the drive circuitry. The VFO signal is a measurement of changes in velocity of a spindle motor 15 (illustrated in FIG. 1) that rotates the storage disk during operation of the disk drive. Thus, the VFO signal effectively monitors changes in the speed of the storage disk. When head-to-disk contact occurs, the friction between the slider and the storage disk in a downtrack direction can result in a decreased velocity of the storage disk. In this embodiment, a certain level of modulation of the VFO signal indicates that the speed of rotation of the storage disk has decreased as a result of head-to-disk contact.

Various methods of determining head-to-disk contact are described in co-pending U.S. patent application Ser. No. 11/101,112, filed by Schreck, et al. on Apr. 7, 2005, and assigned to Maxtor Corporation. To the extent permitted, the contents of U.S. patent application Ser. No. 11/101,112 are incorporated herein by reference.

With each of the methods of determining the approximate moment when the read/write head moves between head-to-disk contact and non-head-to-disk contact, detection of relatively inconsistent or anomalous contact is inhibited. The described methods detect when contact between the read/write head and the storage disk has a duration greater than that which occurs during contact with a thermal asperity or other surface deviation, as set forth previously. However, this does not limit the disk drive from having other means of detecting these shorter duration types of anomalous contact between the read/write head and the storage disk, which may be used for other purposes.

Figure 7:
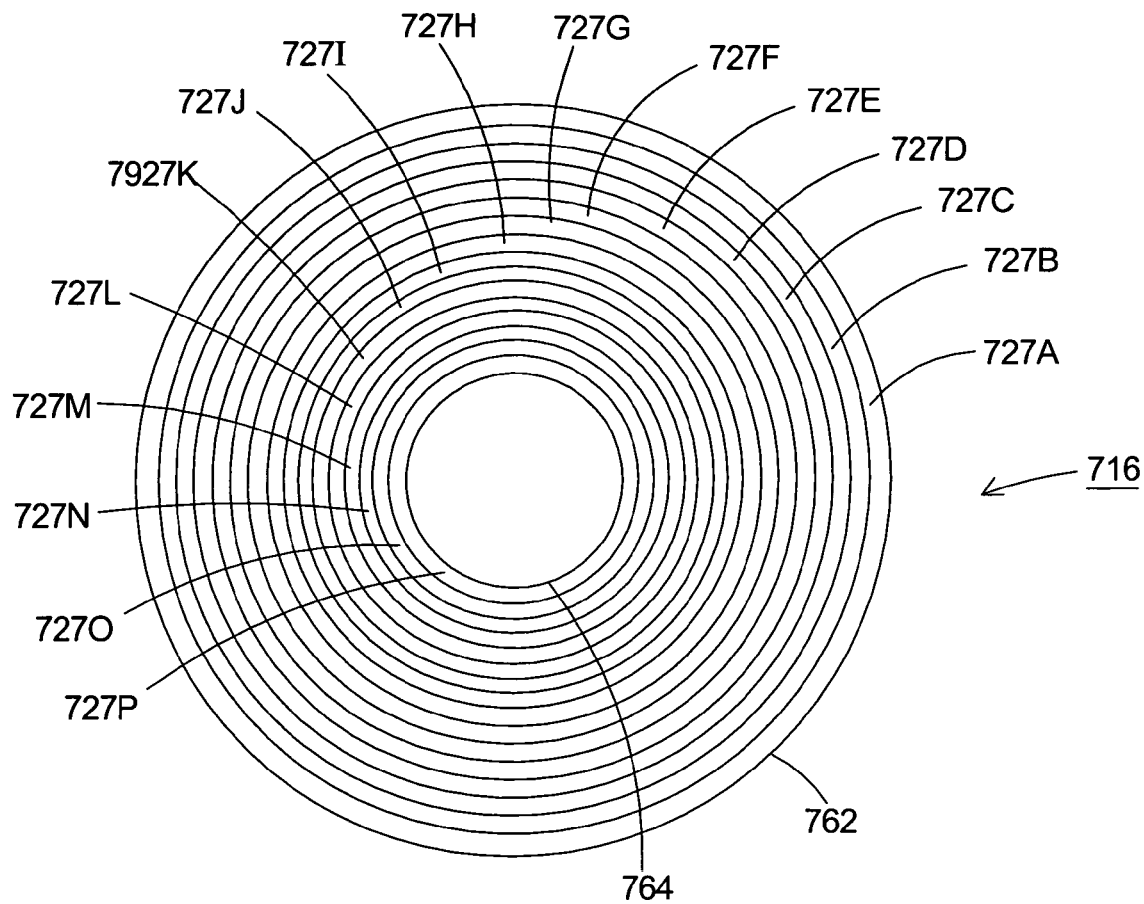
FIG. 7 is a top view of a storage disk illustrating a plurality of disk zones.

FIG. 7 is a top view of a storage disk 716 illustrating a plurality of disk zones 727A-P (also referred to simply as "zones") of varying radii. One or more specific zones on the storage disk 716 can be used for monitoring and detecting head-to-disk contact using the PES variance method and/or the synchronous PES method. For example, in one embodiment, the determination of head-to-disk contact can be performed at three different zones, with each zone including one or more designated tracks. For example, in one embodiment, these designated tracks are specifically designed for allowing head-to-disk contact, and may not contain data which could otherwise be lost. Alternatively, the designated tracks can be standard data tracks or servo tracks, as non-exclusive examples. In one embodiment, the three zones include an outer zone 727A located near the outer diameter 762, an inner zone 727P located near the inner diameter 764, and a middle zone 727E located between the outer zone 727A and the inner zone 727P.

The middle zone 727E can be at zero skew, or it can be at some predetermined non-zero skew angle. In one embodiment, the designated tracks of the middle zone 727E are positioned outside the skew angle range of ±5 degrees. In this embodiment, the PES can be monitored to determine the likelihood of head-to-disk contact at these three zones 727A, 727E, 727P. Further, PES data from these three zones 727A, 727E, 727P can be interpolated for the other zones of the storage disk 716 positioned adjacent to or between these zones 727A, 727E, 727P so that the occurrence of head-to-disk contact in these other zones can be determined and eventually used by the drive circuitry to monitor and/or adjust head-to-disk spacing. The interpolation can be substantially linear or it can incorporate some other suitable non-linear algorithm or formula. Depending upon the location of the selected zones 727A-P, extrapolation can be used in addition to interpolation, or in the alternative.

Alternatively, the determination of head-to-disk contact can be performed on designated tracks in greater or fewer than three zones. For example, in another embodiment, head-to-disk contact can be determined in 16 different substantially concentric zones positioned between the inner diameter and the outer diameter of the storage disk 716.

Once head-to-disk contact has been detected using any of the methods described herein, for a given skew angle, the drive circuitry can measure, calculate or otherwise determine the amplitude of the variable gain amplifier signal for a read channel (VGAR) or a servo channel (VGAS). These signals are also sometimes referred to generically either as VGA signals or as readback voltage amplitudes. Further, VGA signals for head-to-disk contact can be determined at varying skew angles.

Once VGA signals for head-to-disk contact have been determined in a plurality of zones and/or on a plurality of tracks on the storage disk, these zero-clearance references can be "mapped" by interpolation and/or extrapolation, and can be stored by the drive circuitry for use during monitoring and/or adjusting of head-to-disk spacing. With this design, expected VGA signals at a head-to-disk spacing of 0 nm can be determined and/or stored for any radial position on the storage disk. For example, these expected VGA signals can be stored in a look-up table in the memory or firmware of the disk drive.

In one embodiment, from this zero clearance reference, current to the slider mover can be decreased in increments or in an otherwise predetermined manner to raise the read/write head off of the disk surface, thereby increasing the actual head-to-disk spacing. Based on a change in the VGA signal, the actual head-to-disk spacing can be calculated and calibrated for varying levels of current to the slider mover based on the change in amplitude of the VGA signal and/or the radial position over the storage disk, as described herein. It is recognized that other known methods of increasing or otherwise changing the actual head-to-disk spacing can be used during this calibration process. However, for consistency and ease of discussion, adjustment of the actual head-to-disk spacing is described herein through use of the slider mover.

In order to determine the actual head-to-disk spacing, once the zero reference point or reference head-to-disk spacing has been established, the Wallace Spacing Loss equation can be utilized. One form of the basic Wallace Spacing Loss equation is as follows:

$$A = C \ast e^{(-2\pi d F/v)},$$

where A≡track amplitude; C≡is an unknown constant; F≡fundamental frequency of the data pattern; v≡velocity of the read/write head relative to the storage disk; and d≡magnetic spacing (also referred to herein as "head-to-disk spacing"). Note that the constant, C, is not dependent on d but is dependent upon F and v.

Thus, in terms of VGA, the drive circuitry can use one or more algorithms to accurately determine actual head-to-disk spacing as a function of VGA, as follows:

$$A = C \ast e^{(-2\pi d F/v)} \quad [1]$$

$$\log(A) = \log(C) - \log(e)(2\pi d F/v) \quad [2]$$

In one embodiment, $$(20 \ast 256/24)\log(A) = (20 \ast 256/24)\log(C) - \log(e)(20 \ast 256/24)(2\pi d F/v) \quad [3]$$

$$VGA = (20 \ast 256/24)\log(C) - \log(e)(20 \ast 256/24)(2\pi d F/v) \quad [4]$$

In-order to remove the term involving the unknown C, measurements can be taken at two different values of actual head-to-disk spacing that are referred to herein as $d_0$ and $d_1$.

$$VGA[d_1] = (20 \ast 256/24)\log(C) - \log(e)(20 \ast 256/24)(2\pi d1 F/v) \quad [5]$$

$$VGA[d_0] = (20 \ast 256/24)\log(C) - \log(e)(20 \ast 256/24)(2\pi d0 F/v) \quad [6]$$

$$VGA[d_1] - VGA[d_0] = -\log(e)(20 \ast 256/24)(2\pi F/v)(d_1 - d_0) \quad [7]$$

In working up this data, $d_0$ is set to the magnetic spacing when current to the slider mover=0, also referred to as a non-contact level of current ($RSS_0$). Further, $d_1$ represents the magnetic spacing when current to the slider mover is at a value of greater than 0, also referred to as a contact level of current ($RSS_1$). It follows that $(d_1-d_0)$ is the change in actual head-to-disk spacing caused by the change between the contact level of current and the non-contact level of current.

$$VGA[RSS_1] - VGA[RSS_0] = -\log(e)(20 \ast 256/24)(2\pi F/v)(FHA[RSS_1]), \quad [8]$$

where $FHA[RSS_1]$ is the fly height adjust actuation at the non-contact level of current to the slider mover.

If $\Delta VGA[RSS_1]$ is $VGA[RSS_1] - VGA[RSS_0]$, then:

$$\Delta VGA[RSS_1] = -\log(e)(20 \ast 256/24)(2\pi F/v)(FHA[RSS_1]) \quad [9]$$

$FHA[RSS_1]$ is then calculated from the measured $\Delta VGA[RSS_1]$ as follows:

$$FHA[RSS_1] = ((24 \ast \ln(10) \ast v)/(20 \ast 256 \ast 2\pi F))\Delta VGA[RSS_1] \quad [10]$$

Using this equation each test track or any other track can be used to independently measure $FHA[RSS_1]$. The measurements would substantially agree with one another at least within the noise level of the measurement.

Following the Wallace Spacing Loss equation, equation [9] provides for two other methods of extracting $FHA[RSS_1]$ from the dataset. $FHA[RSS_1]$ can be obtained from the slope of $\Delta VGA[RSS_1]$ plotted versus F at constant v or from the slope of $\Delta VGA[RSS_1]$ plotted versus 1/v at constant F. Both of these plots ideally are linear with zero intercept.

The two methods of slope based $FHA[RSS_1]$ calculation can be simplified by defining two new quantities that are referred to herein as frequency normalized VGA (fnVGA) and velocity normalized VGA (vnVGA). These two quantities are defined herein as follows:

$$vnVGA[RSS_1] \equiv (24 \ast \ln(10) \ast v)/(2\pi \ast 20 \ast 256)\Delta VGA[RSS_1] \quad [11]$$

$$fnVGA[RSS_1](24 \ast \ln(10) \ast)/(20 \ast 256 \ast 2\pi F)\Delta VGA[RSS_1] \quad [12]$$

It then follows from equation [9] that:

$$vnVGA[RSS_1] = FHA[RSS_1] \ast F \text{ and} \quad [13]$$

$$fnVGA[RSS_1] = FHA[RSS_1] \ast (1/v) \quad [14]$$

Equation [13] can be used to extract a measure of FHA [$RSS_1$] at each of the test locations, with one or more of the test locations having a varying range of frequencies, such as from 50 MHz up to 197.5 MHz, for example.

Equation [14] can be used to extract a measure of FHA [$RSS_1$] using the data written radially across the drive at a series of fixed frequencies having a varying range, such as from 50 MHz up to 197.5 MHz, for example.

In summary, the above equations allow a determination of not only the change in head-to-disk spacing [$d_1-d_0$] following actuation of the read/write head relative to the storage disk, but also allow for an accurate determination of the actual head-to-disk spacing [$d_N$] at any given time, and/or any given radial location of any of the read/write heads relative to the corresponding storage disk. Once the zero reference $[d_0]$ is determined at any particular location on the storage disk, a corresponding $VGA[d_0]$ amplitude is measured, calculated or otherwise determined. In other words, when the actual head-to-disk spacing is 0 nm, the $VGA[d_0]$ amplitude is measured, communicated to the drive circuitry and stored. In other words, the $VGA[d_0]$ amplitude is known, permitting application of the equations provided above to determine the actual head-to-disk spacing $[d_1]$ at an initially unknown head-to-disk spacing.

When the actual head-to-disk spacing increases from 0 nm as a result of any suitable method which can include a decrease in current directed to the slider mover, for example, the VGA amplitude also changes from $VGA[d_0]$ to $VGA[d_1]$. This change in VGA, e.g., $VGA[d_0-d_1]$, is applied to the Wallace Spacing Loss equations provided above to yield an accurate determination of the actual head-to-disk spacing $[d_1]$ at any point in time during operation of the disk drive. It is recognized that this determination can be independently performed for any or all of the read/write heads in the disk drive, and is not limited to any one read/write head.

In one embodiment, VGA measurements can be taken at multiple frequencies and/or multiple radial locations relative to the storage disk. Use of equations [13] and [14] can be used to determine actual head-to-disk spacing. The two frequency form of the head-to-disk spacing measurement is detailed in equation [15], as follows:

$$d_1-d_0=(24*\ln(10)*)/(20*256*2\pi(F_2-F_1))(VGA[F_2,D1]-VGA[F_1,D_1]+VGA[F_1,D_0]-VGA[F_2,D_1]) \quad [15]$$

Monitoring of the actual head-to-disk spacing by the drive circuitry can occur periodically at timed intervals during use of the disk drive. Alternatively, monitoring can occur before, during or after certain events, such as at startup, and/or transitions between various operations of the disk drive and/or other designated triggering events. Still alternatively, monitoring of the head-to-disk spacing can occur constantly or on an instantaneous basis.

In addition, once the zero reference has been established, a systematic process can occur that incorporates the methods provided herein to facilitate calibration and/or mapping of the actual head-to-disk spacing of one or more read/write heads. This calibration can be based on one or more of the VGA amplitude signals, the level of current directed to the slider mover via the drive circuitry, and the radial positioning of the read/write head relative to the storage disk. Further, by using interpolation and/or extrapolation, the calibration of head-to-disk spacing is not limited to certain zones or to areas of the storage disk having designated test tracks. Stated another way, the actuation sensitivity, e.g., the extent of head-to-disk spacing changes for given power levels delivered to the slider mover over the entire range of radial movement of the slider, can be mapped and/or logged, thereby effectively calibrating each individual slider and/or slider mover. This calibration of actuation sensitivity can also be coordinated with other drive operations, such as during reading, writing, seeking, etc., which may have an impact on the temperature of a portion of the slider.

Once the drive circuitry can determine and/or monitor the actual head-to-disk spacing for a particular read/write head, the specific level of current necessary to invoke a change in the actual head-to-disk spacing can be determined and implemented. For example, once the drive circuitry has determined that the read/write head has an actual head-to-disk spacing of 6 nm, and a desired head-to-disk spacing of 5 nm, by coordination between the drive circuitry and the slider mover, the head-to-disk spacing can be decreased to the desired level. In one embodiment, the current to the slider mover can be increased until the pre-calibrated VGA amplitude is measured by the slider and communicated to the drive circuitry, at which point the current to the slider mover is adjusted to maintain the desired VGA amplitude, and thus, the desired head-to-disk spacing.

In an alternative embodiment, if a decrease in the head-to-disk spacing of 1 nm is desired from the present head-to-disk spacing, the drive circuitry directs a pre-calibrated level of current to the slider mover. In this embodiment, the newly reached head-to-disk spacing can be monitored and/or confirmed by comparing the actual VGA amplitude at one or more frequencies or radii with an expected calibrated VGA amplitude at one or more frequencies or radii. For instance, if a change in head-to-disk spacing from 5 nm to 4 nm has been calculated using the equations provided herein to result in an expected VGA amplitude, the measured VGA amplitude can be compared to this expected VGA amplitude to check the actual head-to-disk spacing. If a significant discrepancy is found, the drive circuitry can change the level of current to the slider mover accordingly, and the VGA amplitude can be checked again. This process can be repeated as necessary to force the actual head-to-disk spacing as close to the desired head-to-disk spacing as practicable.

Figure 8:
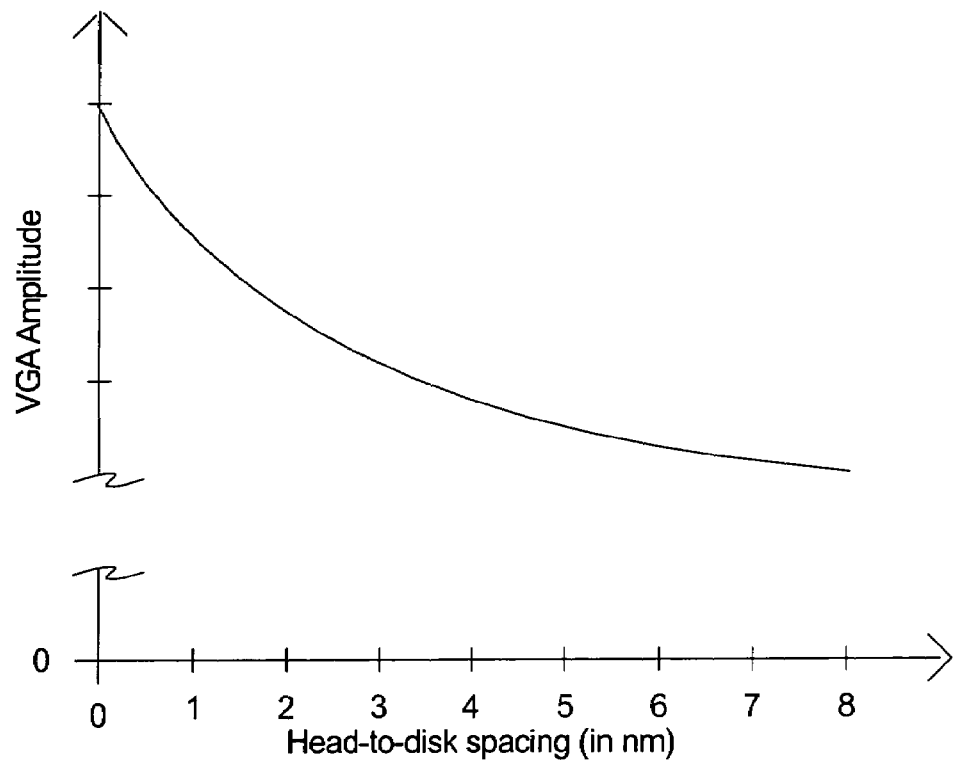
FIG. 8 is a graphical representation of amplitude of a variable gain amplifier as a function of head-to-disk spacing in the disk drive.

FIG. 8 graphically illustrates that a measured, calculated and/or otherwise determined VGA amplitude can accurately translate into a determination of the actual head-to-disk spacing for the given VGA amplitude. Thus, the drive circuitry can dynamically determine the head-to-disk spacing for any read/write head in the disk drive, at any radial position on the storage disk, by measuring the amplitude of the VGA signal once the slider has been calibrated relative to the storage disk as described herein.

Figure 9:
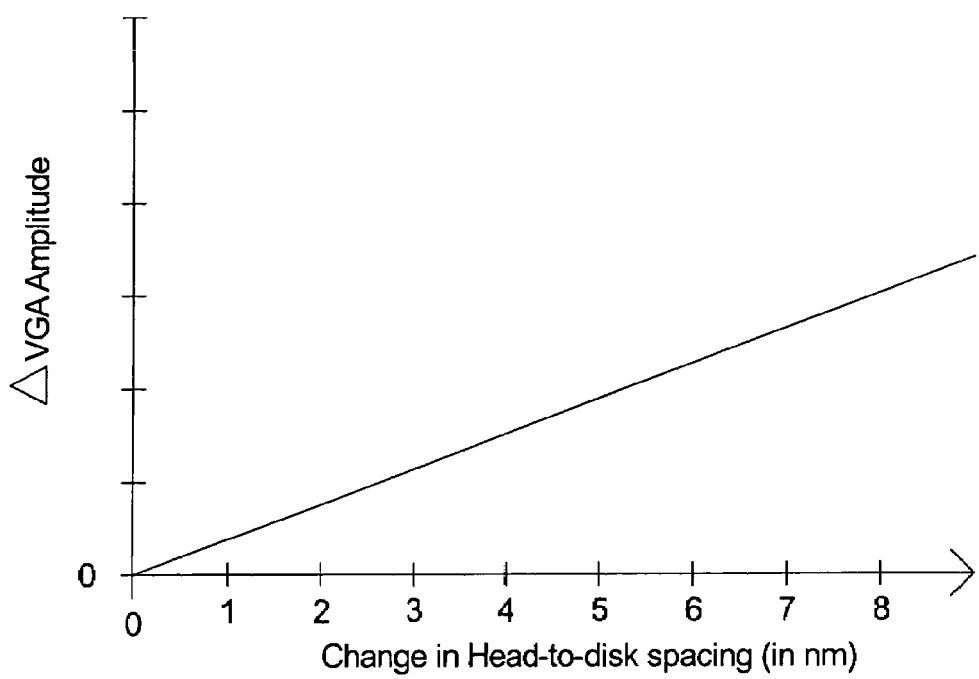
FIG. 9 is a graphical representation of the change in amplitude of the variable gain amplifier as a function of the change in head-to-disk spacing in the disk drive.

FIG. 9 graphically illustrates that a change in VGA amplitude will translate into an ascertainable level of actuation of the read/write head relative to the storage disk. In other words, a specific incremental change in VGA amplitude will have a corresponding specific incremental change in the head-to-disk spacing. Although the curve illustrated in FIG. 9 is shown as substantially linear, it is recognized that the curve can be non-linear. Stated another way, the change in VGA amplitude may have a different incremental effect on the change in head-to-disk spacing depending upon numerous factors, including slider design, rotational velocity of the storage disk, radial position of the slider, distance between the slider and the storage disk, etc. However, provided the disk drive has been calibrated as provided herein, either during manufacturing or during in-situ use of the disk drive by a user, the actual head-to-disk spacing can be accurately determined and monitored.

A further application of the present invention includes accurately determining the extent of EPTP and/or WPTP of any or all of the read/write heads once calibration of the read/write heads relative to each respective storage disk has occurred as provided herein. For example, if a specific known level of current is directed to the slider mover while the drive is relatively cold, a known VGA amplitude is expected. Once the drive heats up, the VGA amplitude can change, even though no change in current to the slider mover has occurred and no write operation is presently taking place. In one embodiment, this change can be attributed to EPTP caused by an overall increase in temperature of the disk drive. The extent of the EPTP, e.g., the specific distance that the read/write head protrudes toward the storage disk, is determined by the drive circuitry based on the change in VGA amplitude, as provided above. In this embodiment, the change in VGA amplitude is not attributable to head-to-disk spacing changes because a constant level of current is being directed, if at all, to the slider mover, and because no writing (thus, no WPTP) is occurring. Thus, the extent of EPTP can be mapped and stored for various drive operations and operating temperatures.

Moreover, if a specific known level of current is directed to the slider mover once the drive has reached an equilibrium operating temperature but prior to a write operation, a known VGA amplitude is expected. Once a write operation commences, the VGA amplitude can change, even though no change in current to the slider mover has occurred. In one embodiment, this change can be attributed to WPTP caused by an increase in temperature of the read/write head. The specific distance that the read/write head is protruding toward the storage disk is determined by the drive circuitry based on the change in VGA amplitude, as provided above. In this embodiment, the change in VGA amplitude is substantially attributable to head-to-disk spacing changes caused by WPTP, because the level of current being directed to the slider mover, if any, is substantially constant. Thus, the extent of WPTP can be mapped and stored for repeatable write operations at various zones of the storage disk.

In summary, the temperature sensor information can be coupled to the direction of power to the slider mover by the drive circuitry to accommodate for temperature variations. With this design, the drive circuitry can determine if the head-to-disk spacing is either too small or too great, and can adjust the level of current to the slider mover accordingly. Additionally, the level of current to the slider mover can be coordinated with the timing of read and/or write operations (or any other drive operation) to better adjust the head-to-disk spacing for better reading and/or writing accuracy. Stated another way, the drive circuitry can monitor the temperature of a portion of the slider using the temperature sensor, and together with the VGA amplitude, the drive circuitry can thereby determine and/or more precisely facilitate adjustment of the head-to-disk spacing.

In another embodiment, the drive circuitry can determine whether or not a deviation exists between the expected VGA amplitude and the actual VGA amplitude as a result of changes in altitude of the disk drive. For example, it is well known that an increase in altitude typically results in a decreased head-to-disk spacing. Using the methods provided herein, the actual head-to-disk spacing can be determined by the drive circuitry at any altitude. The drive circuitry can then compensate for the difference in head-to-disk spacing between the disk drive at sea level and at altitude by decreasing the level of current directed to the slider mover by an appropriate amount based on the equations provided herein, and relevant derivatives of these equations. Conversely, the drive circuitry can increase the level of current to the slider mover by an appropriate amount, or other means of lowering the head-to-disk spacing can be employed, if the ambient pressure increases.

In another embodiment, drive circuitry can log one or more types of data associated with monitoring and adjusting the head-to-disk spacing to be used for Self Monitoring Analysis and Reporting Technology (S.M.A.R.T.). For example, the drive circuitry can log the temperature of a portion of the slider with the temperature sensor, along with the power that is directed to the slider mover during various drive operations. With this data, the drive circuitry can monitor whether or not any changes in this data are occurring over time. Theoretically, the events and associated data relating to monitoring and adjusting the head-to-disk spacing should be repeatable. If the drive circuitry determines that the data relating to the same adjustment of head-to-disk spacing over time is changing by a predetermined percentage or amount, failure of the slider or any of its components, or of a portion of the drive circuitry can be predicted.

In one embodiment, the drive circuitry can determine its own degradation or the degradation of a portion of the slider, e.g., the slider mover, enabling the drive circuitry to warn the user of a potential failure, and when the failure may occur, based on extrapolation. It is recognized that although one specific example is provided above, any of the events relating monitoring and/or adjustment of head-to-disk spacing can be logged and used to predict relevant future behavior of the disk drive.

While the particular slider 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
a drive housing;
a storage disk that is rotatably coupled to the drive housing, the storage disk rotating at approximately a first rotational velocity during a drive operation;
a first slider that magnetically interacts with the storage disk, the first slider including a first read/write head that has an actual head-to-disk spacing that is greater than zero nanometers while the storage disk is rotating at approximately the first rotational velocity; and
a drive circuitry that determines the actual head-to-disk spacing based at least partially upon a reference head-to-disk spacing approximately equal to zero nanometers that is determined while the storage disk is rotating at approximately the first rotational velocity.

2. The disk drive of claim 1 wherein the drive circuitry monitors the actual head-to-disk spacing at predetermined time intervals during operation of the disk drive.

3. The disk drive of claim 1 wherein the first slider includes a slider mover that receives current via the drive circuitry, the slider mover causing a deformation of a portion of the first slider to change the actual head-to-disk spacing during rotation of the storage disk.

4. The disk drive of claim 3 wherein the drive circuitry receives a variable gain amplifier signal from the first slider, the drive circuitry changing the current to the slider mover to adjust the actual head-to-disk spacing during rotation of the storage disk based on an amplitude of the variable gain amplifier signal.

5. The disk drive of claim 4 wherein the drive circuitry determines the actual head-to-disk spacing based at least partially upon a radial positioning of the first read/write head relative to the storage disk.

6. The disk drive of claim 3 wherein the drive circuitry receives a present variable gain amplifier signal from the first slider, the drive circuitry changing the current to the slider mover to adjust the actual head-to-disk spacing during rotation of the storage disk based on a comparison between the present amplitude of a variable gain amplifier signal and a desired amplitude of the variable gain amplifier signal.

7. The disk drive of claim 3 wherein the first slider includes a temperature sensor that senses the temperature of a portion of the slider, and wherein the drive circuitry adjusts current to the slider mover based at least partially upon the temperature of the portion of the slider.

8. The disk drive of claim 7 wherein the drive circuitry stores data including the temperature of the portion of the slider and the actual head-to-disk spacing to predict future behavior of the slider mover.

9. The disk drive of claim 8 wherein the future behavior includes failure of the slider mover.

10. The disk drive of claim 3 wherein the drive circuitry calibrates the slider mover by determining an actuation sensitivity of the slider mover as a function of the level of current that is directed to the slider mover.

11. The disk drive of claim 1 wherein the drive circuitry compares an amplitude of a first variable gain amplifier signal for a known first actual head-to-disk spacing with an amplitude of a second variable gain amplifier signal for a second actual head-to-disk spacing that is different than the first actual head-to-disk spacing to determine the second actual head-to-disk spacing.

12. The disk drive of claim 11 wherein the drive circuitry maintains a substantially constant current to the slider mover during a write operation to determine a change in head-to-disk spacing that is attributable to write pole tip protrusion.

13. The disk drive of claim 11 wherein the drive circuitry maintains a substantially constant current to the slider mover during a drive operation to determine a change in head-to-disk spacing that is attributable to environmental pole tip protrusion.

14. The disk drive of claim 1 further comprising a second slider that magnetically interacts with the storage disk, the second slider including a second read/write head that is positioned to have an actual head-to-disk spacing that is greater than zero nanometers during rotation of the storage disk, and wherein the drive circuitry independently determines the actual head-to-disk spacing of the second read/write head during the operation of the disk drive.

15. The disk drive of claim 1 wherein a plurality of actual head-to-disk spacings are calibrated for the first read/write head, each actual head-to-disk spacing being determined based on a respective amplitude of a variable gain amplifier signal that is adapted to be received by the drive circuitry from the first slider.

16. The disk drive of claim 15 wherein the first slider includes a slider mover that receives current via the drive circuitry, the slider mover causing a deformation of a portion of the first slider to change the actual head-to-disk spacing during rotation of the storage disk, and wherein calibration of the actual head-to-disk spacings for the first read/write head is a function of the level of current directed to the slider mover.

17. The disk drive of claim 16 wherein the calibration of the actual head-to-disk spacings for the first read/write head is a function of the radial positioning of the first read/write head relative to the storage disk.

18. A disk drive comprising:
a drive housing;
a storage disk that is rotatably coupled to the drive housing;
a slider that magnetically interacts with the storage disk, the slider including a read/write head that moves from head-to-disk contact to a variable head-to-disk spacing relative to the storage disk; and
a drive circuitry that determines the variable head-to-disk spacing and maintains a substantially consistent rotational velocity of the storage disk as the read/write head moves from head-to-disk contact to the variable head-to-disk spacing.

19. The disk drive of claim 18 wherein the drive circuitry monitors the variable head-to-disk spacing at predetermined time intervals during operation of the disk drive.

20. The disk drive of claim 18 wherein the slider includes a slider mover that receives current via the drive circuitry, the slider mover causing a deformation of a portion of the slider to change the variable head-to-disk spacing during rotation of the storage disk.

21. The disk drive of claim 20 wherein the drive circuitry receives a variable gain amplifier signal from the slider, the drive circuitry changing the current to the slider mover to adjust the variable head-to-disk spacing during rotation of the storage disk based on an amplitude of the variable gain amplifier signal.

22. The disk drive of claim 21 wherein the drive circuitry determines the variable head-to-disk spacing based at least partially upon a radial positioning of the read/write head relative to the storage disk.

23. The disk drive of claim 20 wherein the drive circuitry receives a present amplitude of the variable gain amplifier signal from the slider, the drive circuitry changing the current to the first slider mover to adjust the variable head-to-disk spacing during rotation of the storage disk based on a comparison between the present amplitude of the variable gain amplifier signal and a desired amplitude of the variable gain amplifier signal.

24. The disk drive of claim 20 wherein the first slider includes a temperature sensor that senses the temperature of a portion of the slider, and wherein the drive circuitry adjusts current to the slider mover based at least partially upon the temperature of the portion of the slider.

25. The disk drive of claim 24 wherein the drive circuitry stores data including the temperature of the portion of the slider and the actual head-to-disk spacing to predict future behavior of the slider mover.

26. The disk drive of claim 25 wherein the future behavior includes failure of the slider mover.

27. The disk drive of claim 25 wherein the drive circuitry calibrates the slider mover by determining an actuation sensitivity of the slider mover as a function of the level of current that is directed to the slider mover.

28. The disk drive of claim 20 wherein the drive circuitry maintains a substantially constant current to the slider mover during a write operation to determine a change in head-to-disk spacing that is attributable to write pole tip protrusion.

29. The disk drive of claim 20 wherein the drive circuitry maintains a substantially constant current to the slider mover during a drive operation to determine a change in head-to-disk spacing that is attributable to environmental pole tip protrusion.

30. The disk drive of claim 18 wherein the drive circuitry compares a first variable gain amplifier signal having a first amplitude for the head-to-disk contact and a second variable gain amplifier signal having a second variable amplitude to determine the variable head-to-disk spacing.

31. The disk drive of claim 18 wherein a plurality of head-to-disk spacings are calibrated for the read/write head, each head-to-disk spacing being determined based on a respective amplitude of a variable gain amplifier signal that is received by the drive circuitry from the slider.

32. The disk drive of claim 31 wherein the slider includes a slider mover that receives current via the drive circuitry, the slider mover causing a deformation of a portion of the slider to change the head-to-disk spacing during rotation of the storage disk, and wherein calibration of the head-to-disk spacings for the read/write head is a function of the level of current directed to the slider mover.

33. The disk drive of claim 32 wherein the calibration of the head-to-disk spacings for the read/write head is a function of the radial positioning of the read/write head relative to the storage disk.

34. A disk drive comprising:
a drive housing;
a storage disk that is rotatably coupled to the drive housing, the storage disk rotating at a first rotational velocity that is substantially consistent;
a slider that magnetically interacts with the storage disk, the slider including a read/write head that moves from a first actual head-to-disk spacing equal to approximately zero nanometers while the storage disk is rotating at approximately the first rotational velocity, to a second actual head-to-disk spacing that is greater than zero nanometers while the storage disk is rotating at approximately the first rotational velocity, the slider generating a signal having an amplitude that varies depending upon the actual head-to-disk spacing; and
a drive circuitry that receives the signal from the slider, the drive circuitry determining the second actual head-to-disk spacing based upon the difference between the amplitude of the signal while the read/write head is at the first and second actual head-to-disk spacings.

35. The disk drive of claim 34 wherein the second actual head-to-disk spacing varies.

36. The disk drive of claim 35 wherein the drive circuitry monitors the second actual head-to-disk spacing at predetermined time intervals during operation of the disk drive.

37. The disk drive of claim 34 wherein the slider includes a slider mover that receives current via the drive circuitry, the slider mover causing a deformation of a portion of the slider to change the second actual head-to-disk spacing during rotation of the storage disk.

38. The disk drive of claim 37 wherein the signal is a variable gain amplifier signal, the drive circuitry changing the current to the slider mover to adjust the second actual head-to-disk spacing during rotation of the storage disk based on the amplitude of the signal.

39. The disk drive of claim 38 wherein the drive circuitry determines the second actual head-to-disk spacing based at least partially upon a radial positioning of the read/write relative to the storage disk.

40. The disk drive of claim 38 wherein the drive circuitry receives a present amplitude of the signal from the sliders the drive circuitry changing the current to the first slider mover to adjust the second actual head-to-disk spacing during rotation of the storage disk based on a comparison between the present amplitude of the signal and a desired amplitude of the signal.

41. The disk drive of claim 37 wherein the first slider includes a temperature sensor that senses the temperature of a portion of the slider, and wherein the drive circuitry adjusts current to the slider mover based at least partially upon the temperature of the portion of the slider.

42. The disk drive of claim 41 wherein the drive circuitry stores data including the temperature of the portion of the slider and the actual head-to-disk spacing to predict future behavior of the slider mover.

43. The disk drive of claim 42 wherein the future behavior includes failure of the slider mover.

44. The disk drive of claim 37 wherein the drive circuitry calibrates the slider mover by determining an actuation sensitivity of the slider mover as a function of the level of current that is directed to the slider mover.

45. The disk drive of claim 37 wherein the drive circuitry maintains a substantially constant current to the slider mover during a write operation to determine a change in head-to-disk spacing that is attributable to write pole tip protrusion.

46. The disk drive of claim 37 wherein the drive circuitry maintains a substantially constant current to the slider mover during a drive operation to determine a change in head-to-disk spacing that is attributable to environmental pole tip protrusion.

47. The disk drive of claim 34 wherein the drive circuitry compares an amplitude of the signal for the first actual head-to-disk spacing to an amplitude of the signal for the second actual head-to-disk spacing to determine the second actual head-to-disk spacing.

48. The disk drive of claim 34 wherein a plurality of head-to-disk spacings are calibrated for the read/write head as a function of the amplitude of the signal.

49. The disk drive of claim 48 wherein the slider includes a slider mover that receives current via the drive circuitry, the slider mover causing a deformation of a portion of the slider to change the actual head-to-disk spacing during rotation of the storage disk, and wherein calibration of the actual head-to-disk spacings for the read/write head is a function of the level of current directed to the slider mover.

50. The disk drive of claim 49 wherein the calibration of the actual head-to-disk spacings for the read/write head is a function of the radial positioning of the read/write head relative to the storage disk.

51. A disk drive comprising:
a drive housing;
a storage disk that is rotatably coupled to the drive housing, the storage disk rotating at approximately a first rotational velocity during a drive operation;
a first slider that magnetically interacts with the storage disk, the first slider including (i) a first read/write head that is positioned to have an actual head-to-disk spacing that is greater than zero nanometers while the storage disk is rotating at approximately the first rotational velocity, and (ii) a slider mover causing deformation of a portion of the first slider to change the actual head-to-disk spacing during rotation of the storage disk; and
a drive circuitry that determines the actual head-to-disk spacing based at least partially upon a reference head-to-disk spacing that is determined while the storage disk is rotating at approximately the first rotational velocity, the drive circuitry receiving a variable gain amplifier signal from the first slider; wherein the slider mover receives current via the drive circuitry, the drive circuitry changing the current to adjust the actual head-to-disk spacing during rotation of the storage disk based on an amplitude of the variable gain amplifier signal.

52. A disk drive comprising:
a drive housing;
a storage disk that is rotatably coupled to the drive housing, the storage disk rotating at approximately a first rotational velocity during a drive operation;
a first slider that magnetically interacts with the storage disk, the first slider including (i) a first read/write head that is positioned to have an actual head-to-disk spacing that is greater than zero nanometers while the storage disk is rotating at approximately the first rotational velocity, and (ii) a slider mover causing deformation of a portion of the first slider to change the actual head-to-disk spacing during rotation of the storage disk; and
a drive circuitry that determines the actual head-to-disk spacing based at least partially upon a reference head-to-disk spacing that is determined while the storage disk is rotating at approximately the first-rotational velocity, the slider mover receiving current via the drive circuitry, wherein the drive circuitry compares an amplitude of a first variable gain amplifier signal for a known first actual head-to-disk spacing with an amplitude of a second variable gain amplifier signal for a second actual head-to-disk spacing that is different than the first actual head-to-disk spacing to determine the second actual head-to-disk spacing.

53. A disk drive comprising:

a drive housing;

a storage disk that is rotatably coupled to the drive housing, the storage disk rotating at approximately a first rotational velocity during a drive operation;

a first slider that magnetically interacts with the storage disk, the first slider including (i) a first read/write head that is positioned to have an actual head-to-disk spacing that is greater than zero nanometers while the storage disk is rotating at approximately the first rotational velocity, (ii) a slider mover causing deformation of a portion of the first slider to change the actual head-to-disk spacing during rotation of the storage disk, and (iii) a temperature sensor that senses the temperature of a portion of the slider; and a drive circuitry that determines the actual head-to-disk spacing based at least partially upon a reference head-to-disk spacing that is determined while the storage disk is rotating at approximately the first rotational velocity, the drive circuitry adjusting current to the slider mover based at least partially upon the temperature of the portion of the slider, the drive circuitry storing data including the temperature of the portion of the slider and the actual head-to-disk spacing to predict future behavior of the slider mover, the future behavior including failure of the slider mover.

54. A disk drive comprising:

a drive housing;

a storage disk that is rotatably coupled to the drive housing, the storage disk rotating at approximately a first rotational velocity during a drive operation;

a first slider that magnetically interacts with the storage disk, the first slider including (i) a first read/write head that is positioned to have an actual head-to-disk spacing that is greater than zero nanometers while the storage disk is rotating at approximately the first rotational velocity, and (ii) a slider mover causing deformation of a portion of the first slider to change the actual head-to-disk spacing during rotation of the storage disk; and a drive circuitry that determines the actual head-to-disk spacing based at least partially upon a reference head-to-disk spacing that is determined while the storage disk is rotating at approximately the first rotational velocity, the drive circuitry directing current to the slider mover, the drive circuitry performing a calibration operation on the slider mover by determining an actuation sensitivity of the slider mover as a function of the level of current that is directed to the slider mover.

55. A disk drive comprising:

a drive housing;

a storage disk that is rotatably coupled to the drive housing, the storage disk rotating at approximately a first rotational velocity during a drive operation;

a first slider that magnetically interacts with the storage disk, the first slider including a first read/write head that is positioned to have an actual head-to-disk spacing that is greater than zero nanometers while the storage disk is rotating at approximately the first rotational velocity; and a drive circuitry that determines the actual head-to-disk spacing based at least partially upon a reference head-to-disk spacing that is determined while the storage disk is rotating at approximately the first rotational velocity, the drive circuitry comparing an amplitude of a first variable gain amplifier signal for a known first actual head-to-disk spacing with an amplitude of a second variable gain amplifier signal for a second actual head-to-disk spacing that is different than the first actual head-to-disk spacing to determine the second actual head-to-disk spacing.

56. A disk drive comprising:

a drive housing;

a storage disk that is rotatably coupled to the drive housing, the storage disk rotating at approximately a first rotational velocity during a drive operation;

a first slider that magnetically interacts with the storage disk, the first slider including a first read/write head that is positioned to have an actual head-to-disk spacing that is greater than zero nanometers while the storage disk is rotating at approximately the first rotational velocity;

a second slider that magnetically interacts with the storage disk, the second slider including a second read/write head that is positioned to have an actual head-to-disk spacing that is greater than zero nanometers during rotation of the storage disk; and a drive circuitry that determines the actual head-to-disk spacing of the first read/write head based at least partially upon a reference head-to-disk spacing that is determined while the storage disk is rotating at approximately the first rotational velocity, and the drive circuitry independently determines the actual head-to-disk spacing of the second read/write head during the operation of the disk drive.

57. A disk drive comprising:

a drive housing;

a storage disk that is rotatably coupled to the drive housing, the storage disk rotating at approximately a first rotational velocity during a drive operation;

a first slider that magnetically interacts with the storage disk, the first slider including a first read/write head that is positioned to have an actual head-to-disk spacing that is greater than zero nanometers while the storage disk is rotating at approximately the first rotational velocity; and a drive circuitry that determines the actual head-to-disk spacing based at least partially upon a reference head-to-disk spacing that is determined while the storage disk is rotating at approximately the first rotational velocity, wherein a plurality of actual head-to-disk spacings are calibrated for the first read/write head, each actual head-to-disk spacing being determined based on a respective amplitude of a variable gain amplifier signal that is adapted to be received by the drive circuitry from the first slider.

* * * * *

UNITED STATES PATENT AND TRADEMARK OFFICE
CERTIFICATE OF CORRECTION

PATENT NO. : 7,310,194 B1  Page 1 of 1
APPLICATION NO. : 11/101089
DATED : December 18, 2007
INVENTOR(S) : Schardt et al.

It is certified that error appears in the above-identified patent and that said Letters Patent is hereby corrected as shown below:

Column 14, line 46, delete "$fnVGA[RSS_1](24 * \ln(10)*)/(20 * 256 * \pi F)\Delta VGA[RSS_1]$" and insert -- $fnVGA[RSS_1] \equiv (24 * \ln(10)*)/(20 * 256 * 2\pi F)\Delta VGA[RSS_1]$ --

Column 14, line 52, delete "$fnVGA[RSS_1] = FHA[RSS] * (1/v)$" and insert -- $fnVGA[RSS_1] = FHA[RSS_1] * (1/v)$ --

Column 21, lines 45 and 46, delete "sliders the" and insert -- slider, the --

Signed and Sealed this

Thirteenth Day of May, 2008

JON W. DUDAS
*Director of the United States Patent and Trademark Office*